(No Model.)

J. JOHNSON.
TABLE FOR ASSORTING BEANS, NUTS, FRUIT, &c.

No. 293,333. Patented Feb. 12, 1884.

WITNESSES

INVENTOR
Josa Johnson
ATTORNEYS

United States Patent Office.

JOSEE JOHNSON, OF NORFOLK, VIRGINIA, ASSIGNOR, BY MESNE ASSIGN-
MENTS, TO THE NORFOLK STORAGE COMPANY, OF SAME PLACE.

TABLE FOR ASSORTING BEANS, NUTS, FRUIT, &c.

SPECIFICATION forming part of Letters Patent No. 293,333, dated February 12, 1884.

Application filed April 14, 1883. (No model.)

*To all whom it may concern:*

Be it known that I, JOSEE JOHNSON, a citizen of the United States, residing at Norfolk, in the county of Norfolk and State of Virginia, have invented certain new and useful Improvements in Separating or Assorting Tables; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
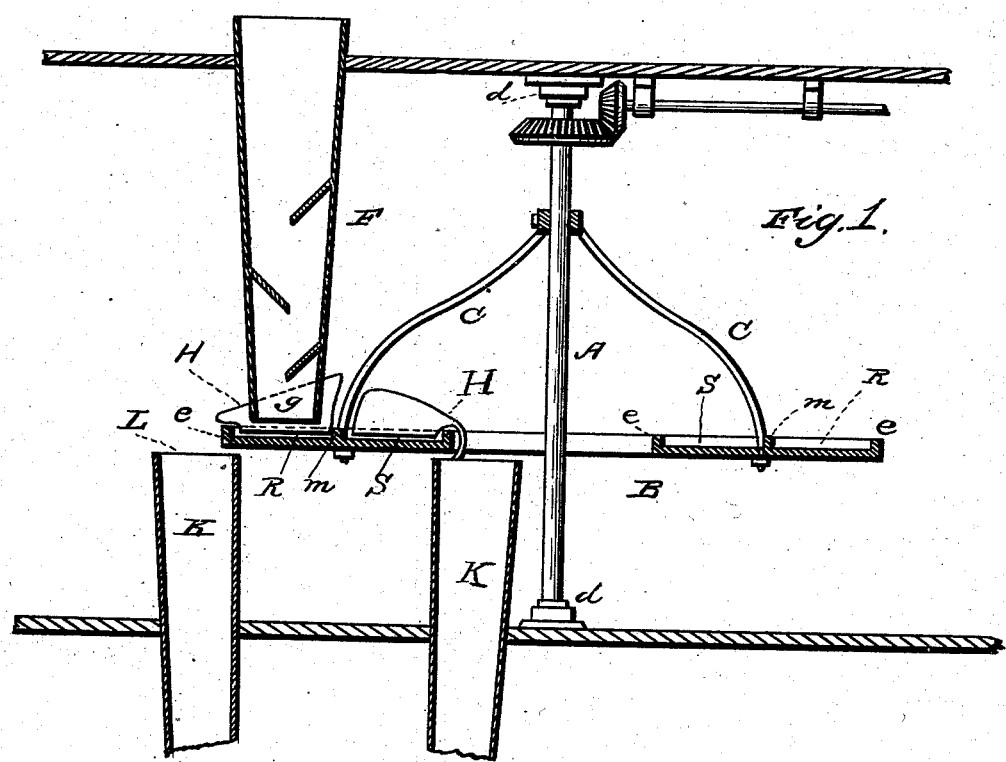
Figure 2:
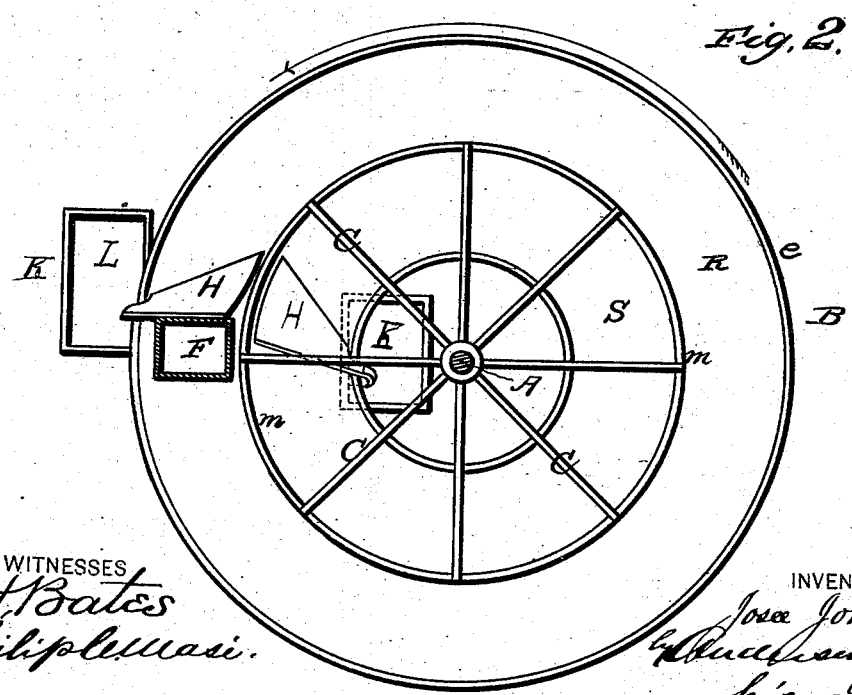

Figure 1 of the drawings is a vertical sectional view, and Fig. 2 is a top view.

This invention has relation to improvements in tables for assorting beans, nuts, fruit, &c.; and it consists in the construction and novel arrangement of a circularly-rotary picking-table having a subdividing-partition extending circularly around the table, and, in connection therewith, of automatic discharging devices for the compartments, chutes, or reservoirs into which the discharge is made, and a chute for delivering on the table, all as will be hereinafter more fully set forth and claimed.

In the accompanying drawings, A designates a pivotal shaft or stem, to which the circular table B is connected by arms C, said shaft having its ends seated in suitable bearings, *d*; or the arms C may be attached to an annular collar arranged to rotate on a pivotal bearing. The table B is circular and level, and it is provided with marginal rims or walls *e*, rising above its level surface, and serving to prevent the nuts or articles placed on said surface from being casually knocked off by the movements of the picking hands around the table.

F indicates a chute extending downward from a cleaning machine or receiver. The chute is designed to open at *g*, just above the table, and feeds the nuts or other stock thereon. The chute F is stationary, and the table B is rotated by any suitable means.

Just behind the feed-chute F is located an oblique piece of sheet metal or guide-plate, H, the slope of which is lateral and upward. The lower edge of this guide-plate rests on the surface of the table, and as the nuts are brought around from the feed-chute by the rotary table the latter moves under the guide-plate or discharger H, which causes the nuts to move upward and laterally and flow over the marginal wall of the table into a chute or receiver, K, which is arranged with its mouth L in position to receive them. While the table is making its revolutions, the nuts thereon are assorted by the hands, who are arranged around the table in position to operate thereon. These hands select out the grades or kinds of nuts to be separated, allowing those which remain on the table to complete the circuit and be discharged, as hereinbefore described. The stock picked out by the hands may be passed into a chute or receiver arranged in position to receive it.

In constructing the table it is preferred to separate its surface into compartments by means of a rise or rib, *m*, which extends circularly around the table parallel to its marginal wall. In this manner independent annular compartments R and S are provided on the table, each compartment having its oblique discharging-plate H and a discharge-chute, K, in juxtaposition thereto, into which the nuts pass. In operating upon a table having the partition *m*, the hands pick the lower-class stock from the near compartment, R, and throw it into the other compartment, S, leaving the best grade in the compartment R. In this construction both classes of goods are automatically discharged from the compartments, and the results of the assorting work of the hands can be constantly inspected, as it lies in full view on the table. The working capacity of the rotary table can be materially increased by constructing it with an open center, and with external and internal table-sections separated by a circular interspace. When the table is thus constructed, a second set of hands can be arranged in the open center to work on the inner table, while the main set work on the outer table. In this construction the second-class goods or nuts are discharged through the interspace between the inner and outer tables into a chute below, while the best goods are discharged into chutes below the marginal portions of said tables; or the first-class goods may be picked out by the hands and thrown into the second compartment; or any advisable principle of selection may be adopted, according to the character of the mixed stock which is to be separated.

Having described this invention, what I claim, and desire to secure by Letters Patent, is—

1. A circular rotary picking-table having a subdividing-partition extending circularly around the table, and automatic discharging devices for the compartments, in combination with the chutes or receivers into which the discharge is made, substantially as specified.

2. A horizontal rotary picking-table having a subdividing-partition extending circularly around the table, and each compartment provided with an automatic discharging device, substantially as and for the purpose specified.

In testimony whereof I affix my signature in presence of two witnesses.

JOSEE JOHNSON.

Witnesses:
G. H. FREY,
DAVIES VELLINES.